United States Patent

[11] 3,579,274

[72] Inventors Arne Jensen
Havnbjerg, Als, Denmark;
Tom Kastrup Petersen, Nordborg, Denmark
[21] Appl. No. 755,299
[22] Filed Aug. 26, 1968
[45] Patented May 18, 1971
[73] Assignee Danfoss A/S
Nordorg, Denmark
[32] Priority Aug. 29, 1967
[33] Germany
[31] D53955

[54] GENERATOR FOR PRODUCING TRIANGULAR SIGNALS
9 Claims, 3 Drawing Figs.

[52] U.S. Cl. 307/228, 307/229, 328/142, 328/181
[51] Int. Cl. H03k 4/06
[50] Field of Search 328/127, 128, 142, 143, 181; 307/228, 229, 230

[56] References Cited
UNITED STATES PATENTS

| | | | |
|---|---|---|---|
| 3,138,767 | 6/1964 | Levin | 328/181X |
| 3,188,455 | 6/1965 | Qvick, Sr. | 307/229X |
| 3,238,383 | 3/1966 | Falk | 328/127X |
| 3,274,501 | 9/1966 | Heinsen | 328/127 |

*Primary Examiner*—Donald D. Forrer
*Assistant Examiner*—R. C. Woodbridge
*Attorney*—Wayne B. Easton

ABSTRACT: A wave generator having an oscillator and a flip-flop generating two square waves of constant frequency and one of which is varied in amplitude in dependence upon the varying amplitude of a control signal received in a control circuit and the other of which is limited in amplitude by a limiter. The two square waves are applied to and added in a summing circuit and integrated in a differentiating amplifier with a limiter and emitter follower feedback circuit.

Patented May 18, 1971 3,579,274

2 Sheets-Sheet 1

GENERATOR FOR PRODUCING TRIANGULAR SIGNALS

This invention relates generally to wave generators and more particularly to a generator for producing triangular signals or waveforms of constant frequency and a variable amplitude.

Triangular signals of constant frequency are needed for various purposes. For instance, a width-modulated square wave voltage for controlling the speed of AC motors can be obtained from the intersections of a triangular signal at a higher frequency than an alternating-voltage signal of a lower frequency with which it intersects.

A known wave generator for producing triangular signals or waveforms of constant frequency comprises a positive direct current voltage source and a negative direct current voltage source which can be connected to an integrating network by means of a switch. The integrated value is compared with a positive or a negative reference voltage. As soon as the reference level is attained the switch operates. However, this generator can only be used for producing triangular signals of constant amplitude.

A principal object of the present invention is to provide apparatus as simple as possible for producing triangular signals or waves of constant frequency and a variable amplitude.

This is done, according to the invention, by first generating a square wave voltage of constant frequency and variable amplitude and then integrating this voltage. The square wave voltage determines the frequency of the triangular wave voltage. Variations in the amplitude of the triangular wave voltage are produced by integration of the varying square wave voltages. Variations in the amplitude of the square wave voltage produce proportional variations in the amplitude of the triangular wave voltage. One advantage of such an arrangement is that a reference voltage equivalent to the amplitude level of the triangular wave voltage is not needed. Thus, the generator of the invention can also be used in cases where only the base portion of the triangular wave voltage, not however the full amplitude of the signal, is to be exploited. In the latter case the effective level of the base portion may simply be determined by fully modulating the integrating amplifier stage.

However, when the triangular signal is of variable amplitude it is not always possible to prevent the amplitude from falling below a predetermined value as a result of voltage fluctuations or other disturbances. This may be undesirable if, for example, in the case of AC motor speed control there is no longer intersection with the lower frequency alternating-voltage signal and control pulses are thus lost. To avoid this disadvantage, a steeper signal of shorter duration may be superimposed on the triangular signals within the peak region. This ensures that a signal corrected in this way will at any rate still have a sufficient amplitude even if the amplitude of the triangular signal were insufficient.

The superimposed signal can simply be generated by interrupting the feedback of the integrating stage, or by making it ineffective, when a predetermined signal voltage has been attained. The amplifier will then immediately assume a condition of full modulation, i.e. the base portion of the triangular signal attains the level of the predetermined signal voltage. The base portion is capped by a substantially square waveform the level of which is determined by the full modulation of the amplifier. However, instead of a square wave signal it would also be possible to cap the base portion with individual impulses.

In a very simple circuit arrangement the integrating stage comprises an amplifier at the output of which the triangular signals are derived and the integrating capacitor of which is connected to the output through a double-sided limiter arrangement. In a preferred embodiment the integrating stage may comprise a differential amplifier the input branch of which consists of a transistor while its output branch consists of two complementary transistors. The output collector of the output transistor is connected to the integrating capacitor at the amplifier through an emitter follower and the limiter circuit is connected to the emitter follower. An interruption of the feedback path will cause a sudden boost of the output signal, so that the level of the latter rises almost instantaneously to the limit predetermined by full modulation. Furthermore, at the output of an externally driven flip-flop (bistable multivibrator) a square wave is derived and applied through a variable double-sided or double limiter to the integrating stage. The simple limiter varies the amplitude of the square wave.

Advantageously a square wave of opposite phase is derived from a second output of the flip-flop and is applied through a double-sided or double limiter to the same input of the integrating stage as the first-mentioned square wave. Since the second limiter is clamped, the effect of the control voltage is reversed at the first limiter, and this may constitute an advantage for instance when forming a reciprocal value. It may also be desirable, sometimes, to let the amplitude of the triangular signals vary not in proportion with the control voltage applied to the adjustable limiter, but inversely proportional therewith.

In this context it is an advantage to include in at least one of the two square wave paths, and preferably in the path including the adjustable limiter, a distortion network or an equalizing network. Sometimes it is advisable to derive signals from the flip-flop, to differentiate them and to apply them to the limiter of the integrating stage. These signals coincide with the peak of the triangular signal. They ensure that predetermined signal levels will still be attained and the integrator feedback interrupted or rendered ineffective even under adverse conditions, i.e. with small amplitudes.

Other features and advantages of the generator in accordance with the present invention will be better understood or described in the following specification and appended claims, in conjunction with the following drawings in which:

Figure 1:
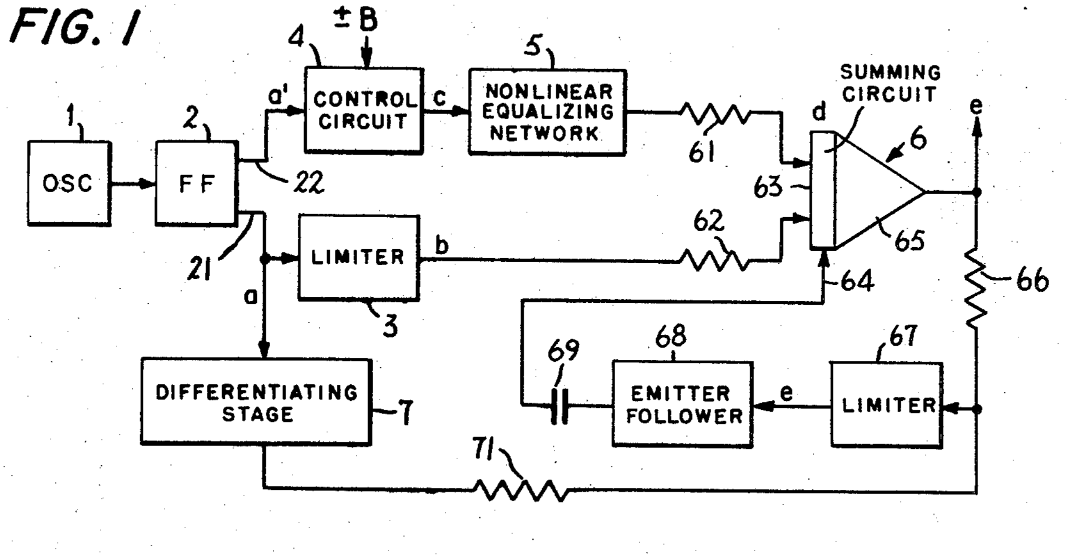
FIG. 1, is a block diagram of an embodiment of a generator according to the invention.

An oscillator 1 transmits pulses at constant frequency, for example at 2000 Hz. or cycles per second. These pulses drive a flip-flop or bistable multivibrator 2 such that an alternately positive and negative signal *a* of constant value is obtained at an output lead 21. The same signal appears phase-displaced as signal *a'* at another output lead 22. The signal *a* is applied to a limiter 3 which accurately fixes the amplitude of the signal *a*, so that a square wave *b* of constant amplitude results as an output of the limiter 3. The signal *a'* is applied to a control circuit 4 in which the amplitude can be varied by means of a control signal B, so that a square wave *c* of variable amplitude is obtained. The signal *c* may be further shaped for nonlinear adaptation in a network 5. The signals *b* and *c* are applied to an integrator/amplifier 6, being first fed through two resistors 61, 62 to a summing element or circuit 63 comprised in this stage to which also a feedback 64 as later explained is applied. The sum *d* is then applied to the amplifier 65 and an integrated signal *e* is derived as the output of the amplifier. A feedback circuit including a resistor 66, a limiter 67, an emitter follower 68 and an integrating capacitor 69 applies a signal *e'* which is equivalent to the signal *e* as long as the limiter 67 has remained inoperative. The signal *a* appearing at the flip-flop output 21 is applied to a differentiating stage 7, and the output pulses of the latter are likewise applied to the integrator/amplifier feedback circuit through a resistor 71.

Figure 2:
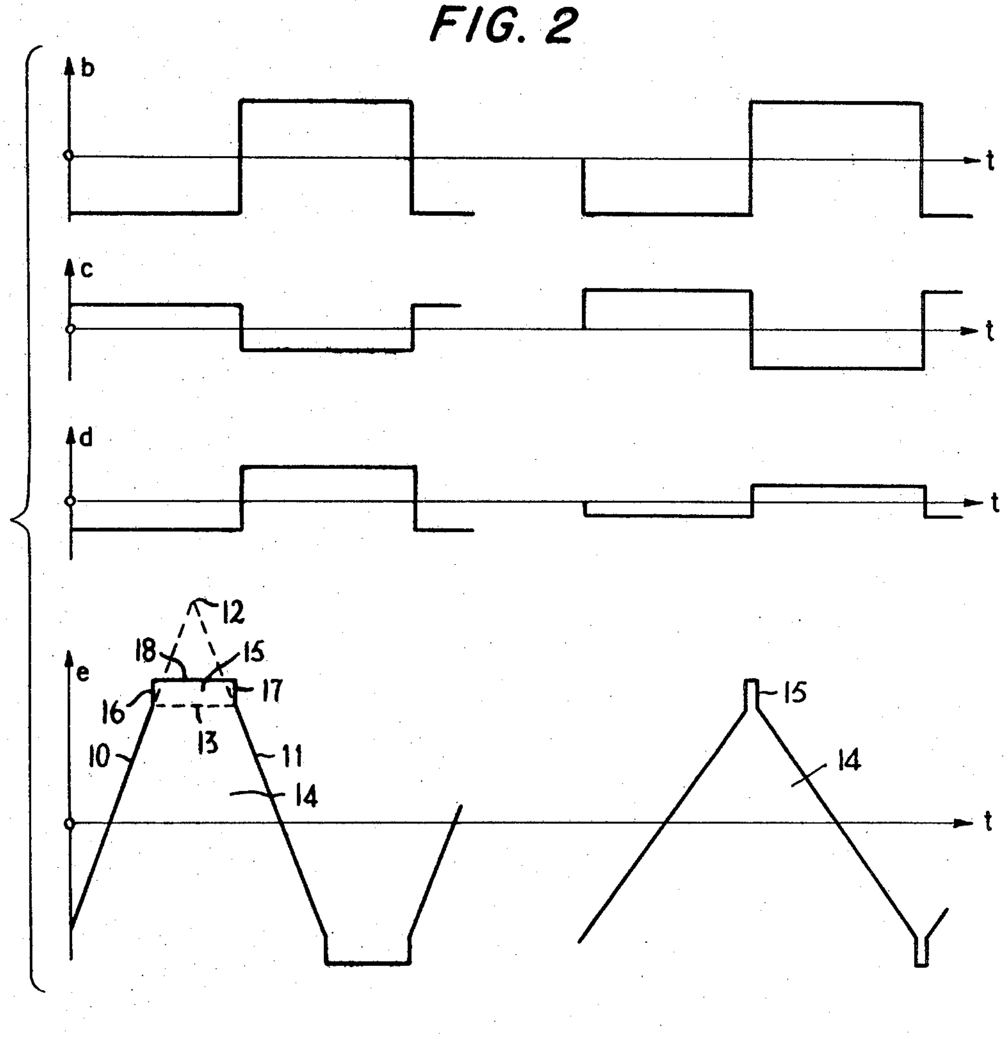
FIG. 2, is a wave diagram illustrating the characteristics of the several signals for two different control voltage levels.

FIG. 2 illustrates the most important signals produced in the above-described circuit, on the left for low values of control voltage B and on the right for higher values of this control voltage. The signal *b* is a square wave of constant frequency and constant amplitude. The signal *c* is a square wave of constant frequency, displaced phase and variable amplitude. The signal *d* is the sum of *b* and *c*, i.e. likewise a square wave of constant frequency and variable amplitude. The positive half-wave of the signal *d* produces the falling or trailing edge 11 of the triangular signal and the negative half-wave the rising or leading edge 10. Without the measures described below the resulting triangular wave would have the amplitude 12. However, the feedback is rendered ineffective by the limiter 67 as soon as the signal *e* or *e'* has attained the level 13, i.e. the voltage level to which the limiter 67 is set. At the same instant the amplifier 65 is modulated fully, so that a square wave signal 15, delimited by two very steep slopes 16, 17 and the level 18 up to which the amplifier can be driven is superimposed on the base portion 14 of the triangular voltage, delimited by the base and the lines 10, 11 and 13. This ensures that the level 13 of the predetermined signal voltage is always exceeded by a safety margin.

When the value of the control voltage B rises the amplitude of the square wave *d* decreases and the amplitude of the triangular voltage decreases. As shown in the right half of FIG. 2, conditions remain the same in other respects. The only difference is that the slopes 16 and 17 of the superimposed square wave approach one another more closely. Should the amplitude 12 of the triangular signal drop below the level 13 of the limiter signal voltage the pulses applied through the differentiating element 7 become effective, their value is such that the level 13 is exceeded at any rate and a superimposed square wave voltage 15 caps the amplitude.

Figure 3:
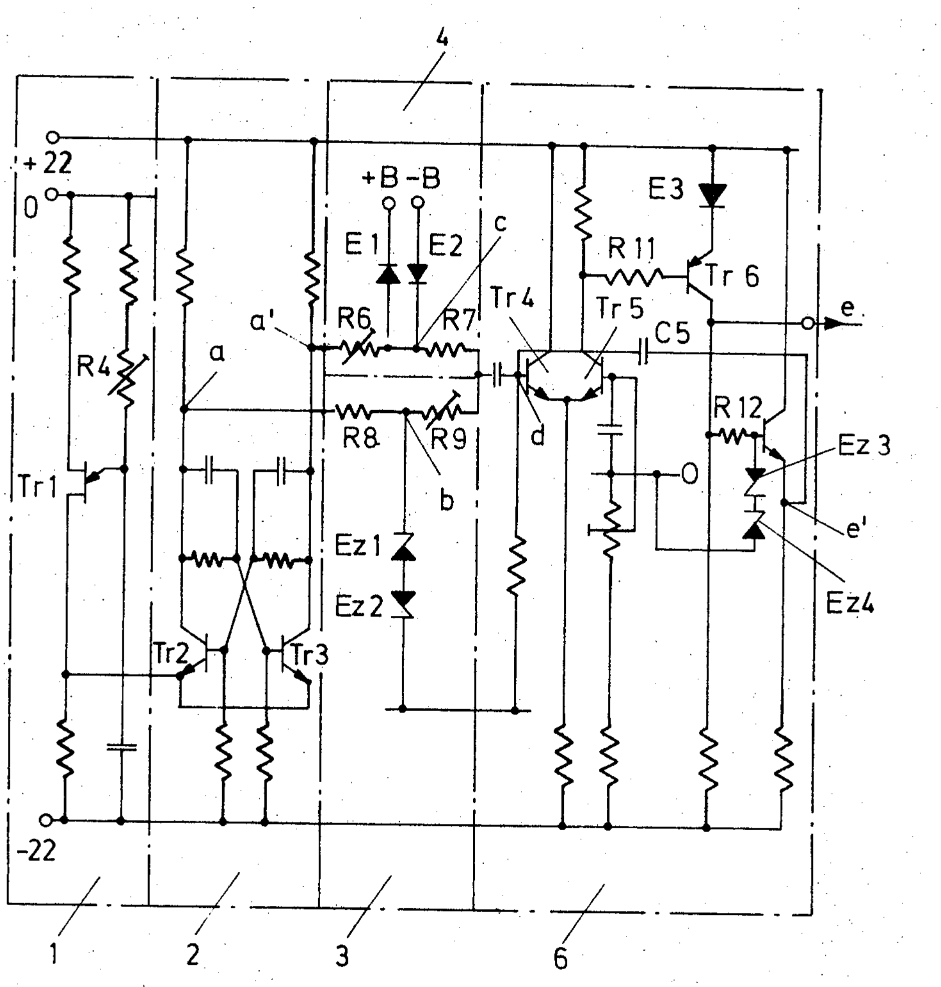
FIG. 3, is a circuit diagram of part of the circuit in FIG. 1.

In the embodiment illustrated in FIG. 3 a supply voltage of +22 v. and −22 v. is envisaged. Furthermore, a control voltage +B and −B is applied. The triangular signal *e* is derived as the output. The oscillator 1 comprises a transistor Tr1 whose emitter circuit includes a variable resistor R4 enabling the desired pulse repetition frequency to be set. The pulses are derived at one of the transistor bases (speaking in terms customary with respect to unijunction transistors) and applied to the input of the flip-flop 2. The latter comprises two transistors Tr2 and Tr3 with the associate resistors and capacitors in a conventional circuit arrangement. The signals *a* and *a'* are obtained as its two outputs.

The signal *a* is applied to a series circuit comprising a fixed resistor R8 and a variable resistor R9. Branched off a junction between these resistors is a limiter in the shape of two Zener diodes Ez1 and Ez2, series-connected back to back, by means of which the amplitude of the signal *a* is kept to the level *b*. The signal *a'* passes through a series-circuit comprising a variable resistor R6 and a fixed resistor R7, and from a junction between these two resistors are branched two diodes E1 and E2, connected in parallel but opposing one another and taken to two terminals across which the control voltage +B and −B is applied. The amplitude of the signal *a'* is limited so as to provide the signal *c*, in dependence upon the value of the level of the signal B.

The signals *c* and *b* are added, and applied through a capacitor C3, to the integrator/amplifier in the shape of signal *d*. This amplifier is a differentiator whose input section consists of an input transistor Tr4 while its output section has two complementary transistors Tr5, Tr6 galvanically coupled to one another through a resistor R11. The emitter of the output transistor Tr6 is in series with a diode E3. The triangular signal *e* is obtained at its collector. This voltage is also applied to a limiter through resistor R12. The limiter consists of Zener diodes Ez3 and Ez4, series-connected back to back. The clipped signal *e* is applied in the shape of the signal *e'* to an integrating capacitor C5 through the emitter follower transistor Tr7 and fed back to the base of the input transistor Tr4. With the exception of unit 5 and the differentiating path 7, 71, this circuit arrangement corresponds to that of FIG. 1.

Those skilled in the art will understand that the control voltage +B may be generated, for example, by motor control circuitry, not shown, having a voltage divider connected to a pulsating direct current source of power which has variations in output so that a motor being controlled is controlled to compensate for the power source variations.

While preferred embodiments of the invention have been shown and described it will be understood that many modifications and changes can be made within the true spirit and scope of the invention.

We claim:

1. Wave generator for producing triangular signals of constant frequency and varying amplitude comprising, means generating a train of square wave signals of constant frequency and simultaneously generating a train of square wave signals of constant frequency and varying amplitude, a summing circuit receiving the square wave signals and adding them into a single train of square wave signals of varying amplitude and constant frequency, and integrating means including said summing circuit deriving from said train of square wave signals a train of wave signals having a triangular waveform as an output therefrom.

2. Generator according to claim 1, in which said integrating means comprises limiter means limiting the amplitude of the triangular signals of said output, and means in said integrating means driving a steep-edged signal of lesser duration than the triangular signals and superimposing the steep-edged signals on peaks of each of the triangular signals.

3. Generator according to claim 1, in which said integrating means comprises an integrating amplifier, a feedback circuit including limiter means receiving the output of said amplifier and applying the output limited in amplitude by said limiter means as an input to said summing means.

4. Generator according to claim 1, in which said means generating said square waves comprises an oscillator, a flip-flop circuit receiving the output of said oscillator and deriving two outputs corresponding to said trains of square wave signals, a control circuit receptive of one of said two outputs and of a varying control signal varying said one output in amplitude in dependence upon the value of the control signal, a double limiter and differentiating means independently receptive of the other of said two outputs, means to apply the output of said control circuit and the output of said limiter to said summing circuit independently, and means to apply the output of said differentiating means to said integrating means.

5. Generator according to claim 4, in which said control circuit comprises two diodes connected in opposition, and connections for applying said control signal.

6. Generator according to claim 4, in which said integrating means comprises differential amplifier having a single input resistor and an output section comprising two complimentary transistors, one of said transistors comprising an output transistor having an output collector, a feedback circuit comprising a limiter receiving the output of said amplifier, an emitter follower receiving the output of said limiter, and an integrating capacitor connected to receive the output of said emitter follower and connected to apply an input to said summing circuit.

7. Generator according to claim 4, including a nonlinear equalizing network connected in said means to apply the output of said control circuit to said summing circuit.

8. A method of generating a triangular wave of constant frequency and comprising, simultaneously generating two square waves opposite in phase, modifying a first of said square waves in amplitude proportionately to a control signal varying in amplitude, limiting the second of said two square waves, summing the two square waves to obtain a single square wave of constant frequency and varying amplitude, and developing from said single square wave a triangular wave of constant frequency and of constant amplitude.

9. A method of generating a triangular wave of constant frequency, according to claim 8, including limiting the triangular wave and superimposing on the peaks thereof a signal of much shorter duration and having very steep leading and trailing edges defining substantially a rectangular waveform.